(12) United States Patent
Kameda

(10) Patent No.: US 11,999,195 B2
(45) Date of Patent: Jun. 4, 2024

(54) PNEUMATIC TIRE

(71) Applicant: The Yokohama Rubber Co., LTD., Tokyo (JP)

(72) Inventor: Norifumi Kameda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 719 days.

(21) Appl. No.: 16/969,956

(22) PCT Filed: Dec. 25, 2018

(86) PCT No.: PCT/JP2018/047632
§ 371 (c)(1),
(2) Date: Aug. 13, 2020

(87) PCT Pub. No.: WO2019/159544
PCT Pub. Date: Aug. 22, 2019

(65) Prior Publication Data
US 2020/0406684 A1    Dec. 31, 2020

(30) Foreign Application Priority Data

Feb. 14, 2018 (JP) ................................. 2018-024537

(51) Int. Cl.
*B60C 11/12* (2006.01)
*B60C 11/03* (2006.01)
*B60C 11/13* (2006.01)

(52) U.S. Cl.
CPC ...... *B60C 11/0302* (2013.01); *B60C 11/0304* (2013.01); *B60C 11/1236* (2013.01);
(Continued)

(58) Field of Classification Search
CPC ............. B60C 11/0304; B60C 11/1236; B60C 11/1392; B60C 2011/0381; B60C 2011/0346; B60C 2011/0348
See application file for complete search history.

(56) References Cited

U.S. PATENT DOCUMENTS 5,753,058 A    5/1998   Fukumoto et al.
5,833,781 A    11/1998  Fukumoto et al.
(Continued)

FOREIGN PATENT DOCUMENTS

CN    105358339    2/2016
CN    106274299    1/2017
(Continued)

OTHER PUBLICATIONS

Machine translation for Japan 2006-224770 (Year: 2023).*
(Continued)

*Primary Examiner* — Steven D Maki
(74) *Attorney, Agent, or Firm* — Thorpe North & Western

(57) ABSTRACT

A pneumatic tire includes a mounting direction indicator, an inner shoulder and center main grooves, inner shoulder and second lands, and a center land. The inner shoulder and center main grooves are formed inward in a vehicle width direction and extend in a circumferential direction. The inner shoulder and second lands and the center land are defined by the inner shoulder and center main grooves. The inner shoulder land includes a circumferential narrow groove, an inner shoulder lug groove, and an inner shoulder sipe. The circumferential narrow groove extends in the circumferential direction. The inner shoulder lug groove extends from a ground contact edge in a lateral direction, intersects with the circumferential narrow groove, and terminates in the inner shoulder land. The inner shoulder sipe extends from the inner shoulder main groove in the lateral direction, intersects with the circumferential narrow groove, and terminates in the inner shoulder land.

14 Claims, 9 Drawing Sheets

(52) U.S. Cl.
CPC ... *B60C 11/1392* (2013.01); *B60C 2011/0346* (2013.01); *B60C 2011/0348* (2013.01); *B60C 2011/0381* (2013.01); *B60C 2011/1254* (2013.01)

(56) References Cited

U.S. PATENT DOCUMENTS

| | | | |
|---|---|---|---|
| 5,851,322 A * | 12/1998 | Hayashi | B60C 11/0306 152/DIG. 3 |
| 2013/0167994 A1 | 7/2013 | Hada | |
| 2013/0248068 A1 | 9/2013 | Nakata | |
| 2014/0283966 A1 * | 9/2014 | Horiguchi | B60C 11/005 152/209.18 |
| 2015/0136288 A1 | 5/2015 | Nemoto | |
| 2016/0144665 A1 | 5/2016 | Koishikawa | |
| 2017/0210177 A1 * | 7/2017 | Osawa | B60C 11/0306 |
| 2017/0267031 A1 | 9/2017 | Oba | |
| 2018/0194173 A1 * | 7/2018 | Shibai | B60C 11/0302 |
| 2018/0207991 A1 | 7/2018 | Shibai | |
| 2019/0030957 A1 | 1/2019 | Shibai | |
| 2019/0168542 A1 | 6/2019 | Hashimoto et al. | |
| 2020/0282776 A1 * | 9/2020 | Tomomatsu | B60C 11/0304 |
| 2020/0384810 A1 * | 12/2020 | Tomomatsu | B60C 11/1281 |

FOREIGN PATENT DOCUMENTS

| | | |
|---|---|---|
| CN | 107199833 | 9/2017 |
| CN | 111183048 | 5/2020 |
| EP | 213452 A2 * | 3/1987 |
| EP | 0 659 594 | 6/1995 |
| EP | 2 610 081 | 7/2013 |
| JP | 02-179508 A * | 7/1990 |
| JP | 2006-224770 | 8/2006 |
| JP | 2006-224770 A * | 8/2006 |
| JP | 2010-247549 | 11/2010 |
| JP | 2015-189349 | 1/2015 |
| JP | 2015-189349 | 11/2015 |
| JP | 2017-030556 | 2/2017 |
| JP | 2017-030557 | 2/2017 |
| JP | 2017-210191 | 11/2017 |
| WO | WO 2012/098895 | 7/2012 |
| WO | WO 2014/115589 | 7/2014 |
| WO | WO 2015/005194 | 1/2015 |
| WO | WO 2017/022308 | 2/2017 |
| WO | WO 2017/022309 | 2/2017 |
| WO | WO-2017/022309 A1 * | 2/2017 |
| WO | WO 2017/126375 | 7/2017 |
| WO | WO 2017/204354 | 11/2017 |
| WO | WO 2019/098277 | 5/2019 |

OTHER PUBLICATIONS

Machine translation for Japan 02-179508 (Year: 2023).*
Machine translation for Europe 213452 (Year: 2023).*
International Search Report for International Application No. PCT/JP2018/047632 dated Apr. 9, 2019, 4 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|
| ZIGZAG SHAPE OF OUTER SIDE CENTER MAIN GROOVE | NONE | YES | YES | YES | YES | YES | YES | YES | YES | YES | YES |
| AUXILIARY SIPE OF INNER SECOND LAND PORTION | NONE (LUG GROOVE) | NONE (LUG GROOVE) | YES | YES | YES | YES | YES | YES | YES | YES | YES |
| CENTER SIPE | NONE | NONE (LUG GROOVE) | NONE (LUG GROOVE) | YES | YES | YES | YES | YES | YES | YES | YES |
| CIRCUMFERENTIAL NARROW GROOVE OF INNER SHOULDER LAND PORTION | NONE | YES | YES | YES | YES | YES | YES | YES | YES | YES | YES |
| NUMBER OF INNER SHOULDER SIPES BETWEEN INNER SHOULDER LUG GROOVES | 0 | 1 | 2 | 2 | 1 | 1 | 1 | 1 | 1 | 1 | 1 |
| L2/W2 | 0.30 | 0.60 | 0.30 | 0.30 | 0.30 | 0.60 | 0.60 | 0.60 | 0.60 | 0.60 | 0.60 |
| L3/W2 | 0.40 (LUG GROOVE) | 0.40 (LUG GROOVE) | - | 0.40 | 0.40 | 0.40 | 0.20 | 0.20 | 0.20 | 0.20 | 0.20 |
| NUMBER OF AUXILIARY SIPES BETWEEN INNER SECOND LUG GROOVES | - | 1 (LUG GROOVE) | - | 2 | 2 | 2 | 1 | 1 | 1 | 1 | 1 |
| L4/W3 | - | 0.50 (LUG GROOVE) | - | 0.20 | 0.20 | 0.20 | 0.20 | 0.45 | 0.45 | 0.45 | 0.45 |
| L1/W1 | - | 0.65 (LUG GROOVE) | 0.65 | 0.65 | 0.65 | 0.65 | 0.65 | 0.65 | 0.65 | 0.50 | 0.50 |
| D4/D3 | - | 3.00 | 3.00 | 3.00 | 3.00 | 3.00 | 3.00 | 3.00 | 1.30 | 1.30 | 1.30 |
| GROOVE AREA RATIO | 0.35 | 0.35 | 0.35 | 0.35 | 0.35 | 0.35 | 0.35 | 0.35 | 0.35 | 0.35 | 0.20 |
| DRY STEERING STABILITY PERFORMANCE | 100 | 100 | 102 | 104 | 108 | 108 | 110 | 110 | 110 | 112 | 114 |
| WET STEERING STABILITY PERFORMANCE | 97 | 100 | 100 | 100 | 110 | 112 | 112 | 114 | 114 | 114 | 114 |
| UNEVEN WEAR RESISTANCE PERFORMANCE | 97 | 100 | 100 | 104 | 104 | 106 | 106 | 108 | 108 | 110 | 110 |
| PATTERN NOISE PERFORMANCE | 97 | 100 | 102 | 104 | 108 | 108 | 108 | 108 | 108 | 108 | 110 |

FIG. 9

PNEUMATIC TIRE

TECHNICAL FIELD

The present technology relates to a pneumatic tire and particularly relates to a pneumatic tire that can provide dry performance and wet performance of the tire in a compatible manner.

BACKGROUND ART

Recent pneumatic tires have been demanded that steering stability performance on dry road surfaces and steering stability performance on wet road surfaces should be provided in a compatible manner. As conventional pneumatic tires that address this need, technologies described in Japan Unexamined Patent Publication Nos. 2017-030556 and 2017-030557 have been known.

SUMMARY

The present technology provides a pneumatic tire that can provide dry performance and wet performance of the tire in a compatible manner.

A pneumatic tire according to an embodiment of the technology includes a mounting direction indicator, an inner side shoulder main groove and an inner side center main groove, and an inner shoulder land portion, an inner second land portion, and a center land portion. The mounting direction indicator indicates a mounting direction of the tire to a vehicle. The inner side shoulder main groove and the inner side center main groove are formed in a region inward in a vehicle width direction demarcated by a tire equatorial plane and extend in a tire circumferential direction. The inner shoulder land portion, the inner second land portion, and the center land portion are formed by being defined by the inner side shoulder main groove and the inner side center main groove. The inner shoulder land portion includes a circumferential narrow groove, an inner shoulder lug groove, and an inner shoulder sipe. The circumferential narrow groove extends in the tire circumferential direction. The inner shoulder lug groove extends from a tire ground contact edge in a tire lateral direction, intersects with the circumferential narrow groove, and terminates in the inner shoulder land portion. The inner shoulder sipe extends from the inner side shoulder main groove in the tire lateral direction, intersects with the circumferential narrow groove, and terminates in the inner shoulder land portion.

With the pneumatic tire according to the embodiment of the technology, (1) the inner shoulder lug groove and the inner shoulder sipe intersect with the circumferential narrow groove, and thus drainage properties of the shoulder land portion are improved and wet performance of the tire is improved. Additionally, (2) because components intersecting with the circumferential narrow groove are constituted by a combination of the lug groove and the sipe, rigidity of the inner shoulder land portion is increased and dry performance of the tire is improved compared to a configuration in which the same number of lug grooves are disposed intersecting with the circumferential narrow groove. These have an advantage that the wet performance and the dry performance of the tire can be provided in a compatible manner.

BRIEF DESCRIPTION OF DRAWINGS

FIG. 9 is a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
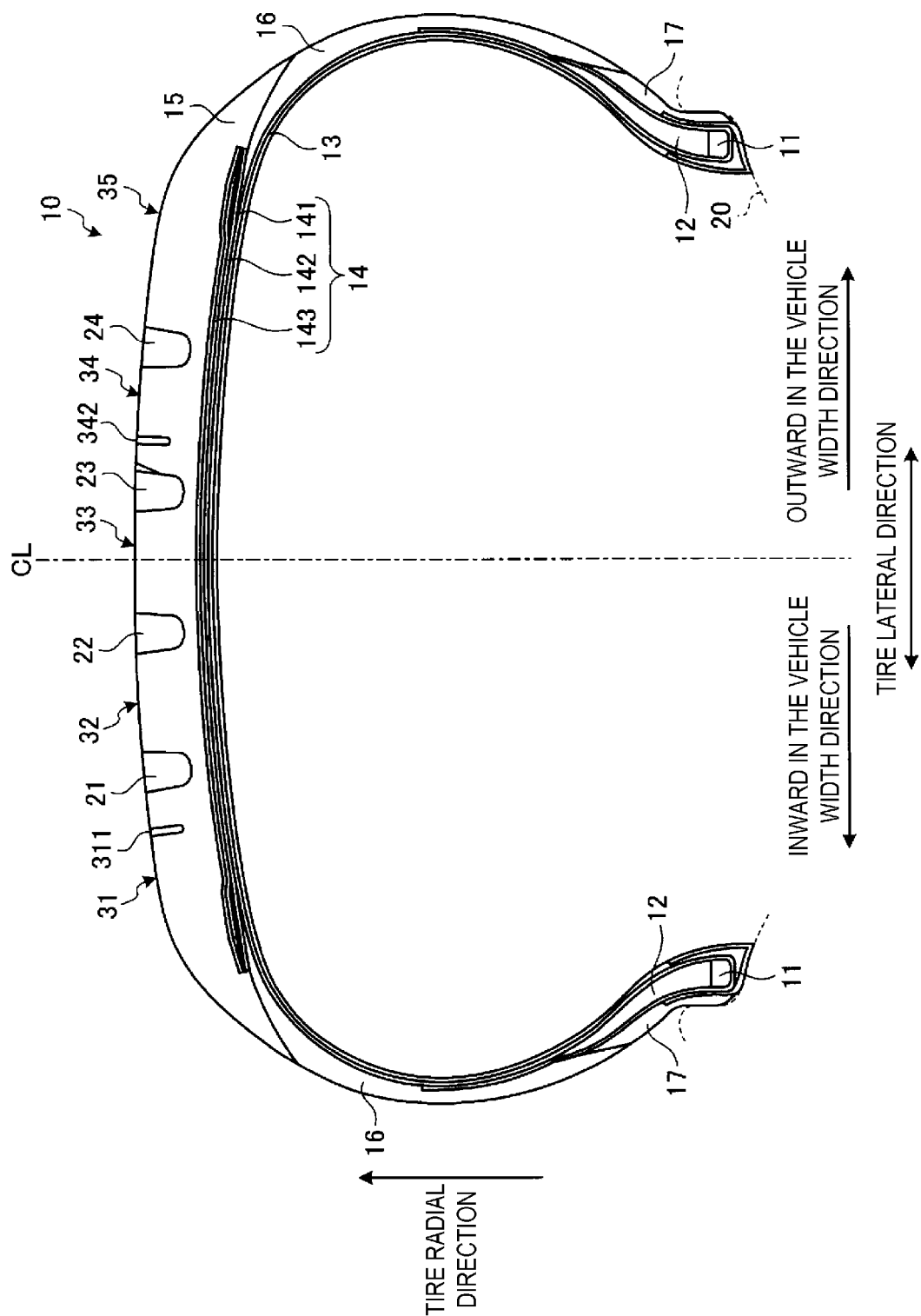
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

Furthermore, inward in the vehicle width direction and outward in the vehicle width direction are defined as directions to the vehicle width direction when the tire is mounted on a vehicle. Additionally, left and right regions demarcated by the tire equatorial plane are defined as a region outward in the vehicle width direction and a region inward in the vehicle width direction, respectively. The pneumatic tire includes a mounting direction indicator (not illustrated) that indicates a tire mounting direction to a vehicle. The mounting direction indicator, for example, is constituted by a mark or ridges/grooves on the sidewall portion of the tire. For example, Economic Commission for Europe Regulation 30 (ECE R30) requires that a vehicle mounting direction indicator is provided on the sidewall portion outward in the vehicle width direction when the tire is mounted on a vehicle.

A pneumatic tire 10 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1). Note that reference sign 20 in FIG. 1 is a rim of a wheel.

The pair of bead cores 11, 11 are formed by annularly and multiply winding one or a plurality of bead wires made of steel, and are embedded in bead portions to constitute cores of the right and left bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of layered carcass plies, and extends between the right and left bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is made by performing a rolling process on coating rubber-covered carcass cords made of steel or an organic fiber material (e.g. aramid, nylon, polyester, rayon, or the like). The carcass ply (plies) has a carcass angle (defined as the inclination angle of the longitudinal direction of the carcass cords with respect to the tire circumferential direction), as an absolute value, ranging from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as an inclination angle of the longitudinal direction of the belt cords with respect to the tire circumferential direction) of opposite signs, and the belts are layered so that the longitudinal directions of the belt cords meet each other (so-called crossply structure). Additionally, the belt cover 143 is made by coating belt cords made of steel or an organic fiber material with a coating rubber. The belt cover 143 has a belt angle, as an absolute value, ranging from 0 degrees to 10 degrees. Further, the belt cover 143 is, for example, a strip material formed by coating one or more belt cords with a coating rubber and winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are each disposed inward of the right and left bead cores 11, 11 and the turned back portions of the carcass layer 13 in the tire radial direction to constitute the rim fitting surfaces of the bead portions.

Tread Pattern

Figure 2:
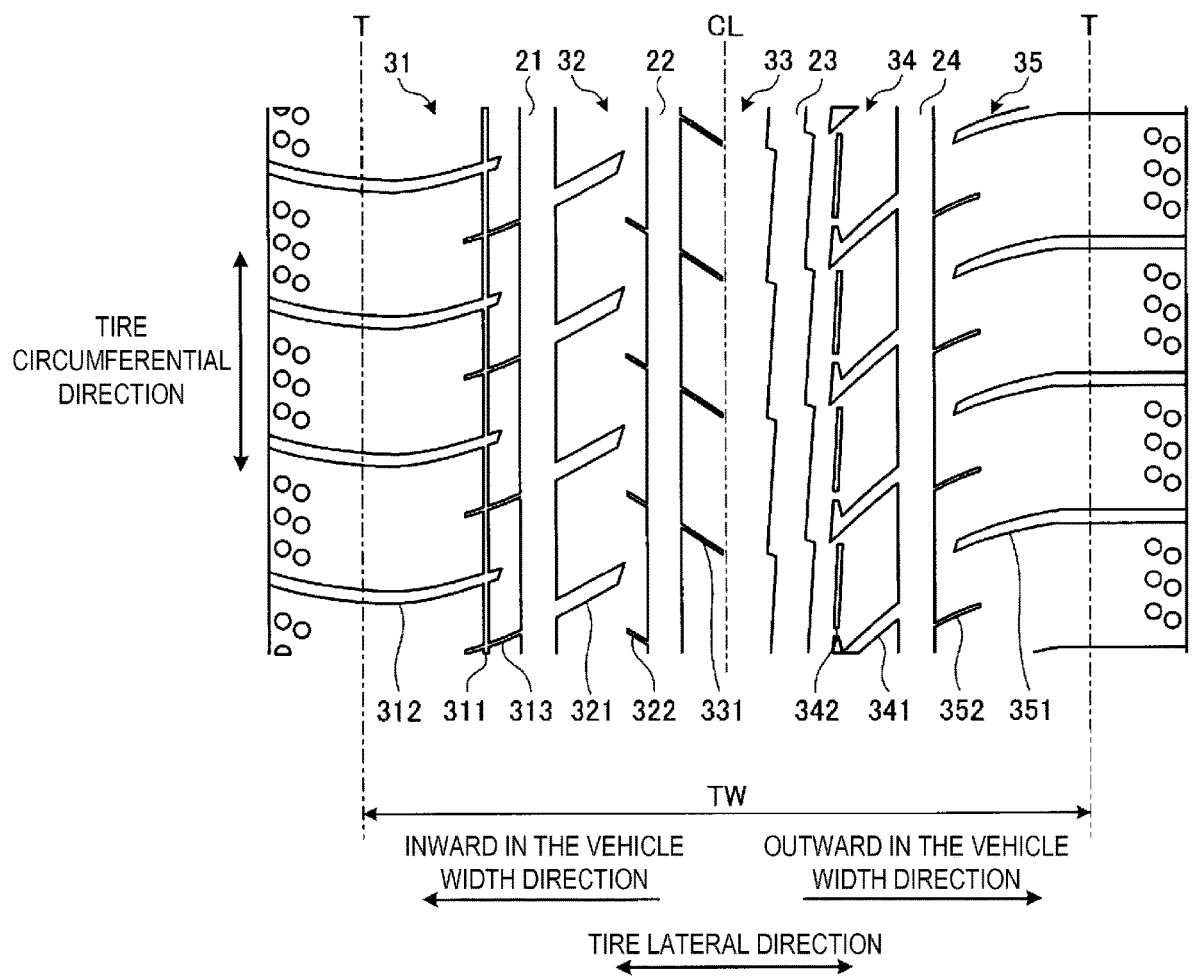
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern for an all-season tire. In reference to the same drawing, "tire circumferential direction" refers to the direction revolving about the tire rotation axis. Reference sign T denotes a tire ground contact edge, and a dimension symbol denotes a tire ground contact width.

As illustrated in FIG. 2, the pneumatic tire 10 includes, in the tread surface, a plurality of circumferential main grooves 21 to 24 extending in the tire circumferential direction and a plurality of land portions 31 to 35 defined by the circumferential main grooves 21 to 24.

"Main groove" refers to a groove on which a wear indicator must be provided as specified by JATMA (the Japan Automobile Tyre Manufacturers Association, Inc.) and has a groove width of 3.0 mm or more and a groove depth of 6.0 mm or more. Lug grooves described later are lateral grooves extending in the tire lateral direction and open when the tire comes into contact with the ground to function as grooves. A sipe described later is a cut formed in a road contact surface of a tread and closes when the tire comes into contact with the ground.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove widths are measured with intersection points where the tread contact surface and extension lines of the groove walls meet as measurement points, in a cross-sectional view normal to the groove length direction. Additionally, in a configuration in which the grooves extend in a zigzag-like or wave-like manner in the tire circumferential direction, the groove width is measured with the center line of amplitude of the groove walls as the measurement point.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, for a passenger vehicle tire, the specified internal pressure is an air pressure of 180 kPa, and the specified load is 88% of the maximum load capacity at the specified internal pressure.

For example, in the configuration of FIG. 2, the pneumatic tire 10 has a left-right symmetric tread pattern with respect to a tire equatorial plane CL. Furthermore, the left and right regions demarcated by the tire equatorial plane CL each have the two circumferential main grooves 21, 22 or 23, 24. These circumferential main grooves 21, 22 and 23, 24 are disposed being left-right symmetric with respect to the tire equatorial plane CL. Five land portions 31 to 35 are defined by the circumferential main grooves 21 to 24 In addition, one land portion 33 is disposed on the tire equatorial plane CL.

Additionally, among the two circumferential main grooves 21, 22 or 23, 24 disposed in one region demarcated by the tire equatorial plane CL, the circumferential main grooves 21, 24 on the tire ground contact edge T side are referred to as shoulder main grooves, and the circumferential main grooves 22, 23 on the tire equatorial plane CL side are referred to as center main grooves. In addition, the shoulder main groove 21 and the center main groove 22 in the region inward in the vehicle width direction are referred to as an inner side shoulder main groove and an inner side center main groove, and the shoulder main groove 24 and the center main groove 23 in the region outward in the vehicle width direction are referred to as an outer shoulder main groove and an outer side center main groove.

For example, in the configuration of FIG. 2, a distance (dimension symbol is omitted in the drawings) from the tire equatorial plane CL to a groove center line of the left or the right shoulder main groove 21, 24 is in the range of from 26% or more to 32% or less of a tire ground contact width TW. A distance from the tire equatorial plane CL to a groove center line of the left or the right center main groove 22, 23 is in the range of from 8% or more to 12% or less of the tire ground contact width TW.

The groove center line of the circumferential main groove is defined as a straight line passing through the midpoint of right and left measurement points of the groove width of the circumferential main groove and parallel to the tire circumferential direction.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

In addition, a region on the tire equatorial plane CL side demarcated by the left and the right shoulder main grooves 21, 24 is referred to as a center region and right and left regions on the tire ground contact edge T side are referred to as shoulder regions.

Moreover, the land portions 31, 35 located outward in the tire lateral direction that are defined by the shoulder main grooves 21, 24 are defined as shoulder land portions. The shoulder land portions 31, 35 are disposed on the most outward in the tire lateral direction and located on the tire ground contact edges T. In addition, the shoulder land portion 31, which is disposed in the region inward in the vehicle width direction, is defined as an inner shoulder land portion, and the shoulder land portion 35, which is disposed in the region outward in the vehicle width direction, is defined as an outer shoulder land portion.

Furthermore, the land portions 32, 34 inward in the tire lateral direction defined by the shoulder main grooves 21, 24 are defined as second land portions. Accordingly, the second land portions 32, 34 are adjacent to the shoulder land portions 31, 35 with the shoulder main grooves 21, 24 disposed therebetween. Also, the second land portion 32 in the region inward in the vehicle width direction is defined as an inner second land portion, and the second land portion 34 in the region outward in the vehicle width direction is defined as an outer second land portion.

Furthermore, the land portion 33 between the second land portions 32, 34 is defined as a center land portion. The center land portion 33 is disposed on the tire equatorial plane CL.

In the configuration of in FIG. 2, a groove area ratio of a tire ground contact region is in the range of from 18% or more to 30% or less. Thus, the dry performance and the wet performance of the tire are balanced.

"Groove area ratio" is defined as: groove area/(groove area+ground contact area). "Groove area" refers to the opening area of the grooves at the ground contact surface. Additionally, "groove" refers to the circumferential grooves and the lug grooves in the tread portion and does not include, for example, sipes, kerfs, and notch portions. "Ground contact area" is measured as a contact area between the tire and a road surface. Additionally, the groove area and the ground contact area are measured at a contact surface between a tire and a flat plate when the tire is mounted on a specified rim, inflated to the specified internal pressure, placed vertically on the flat plate in a static state, and loaded with a load corresponding to the specified load.

Inner Shoulder Land Portion

Figure 3:
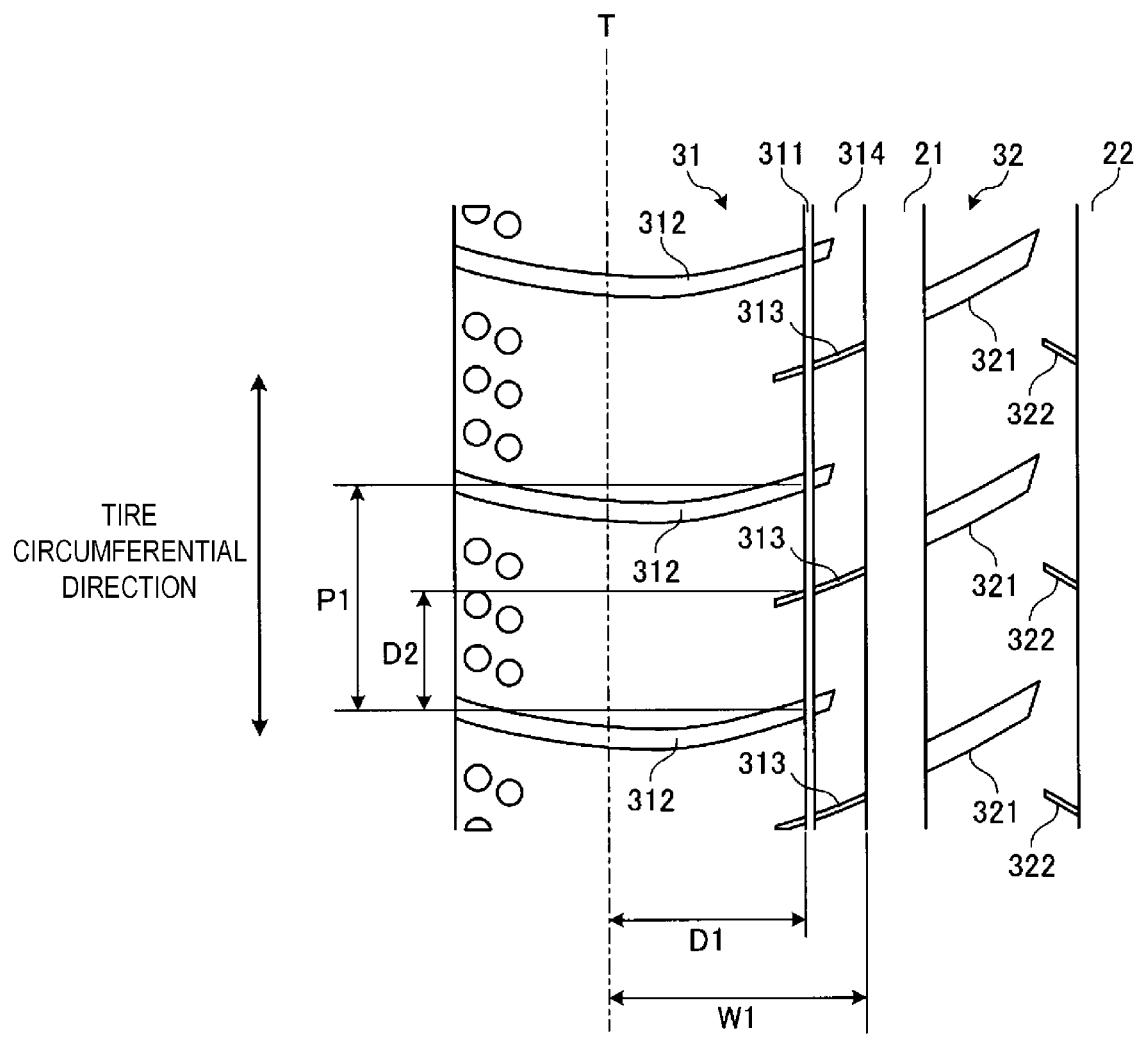
FIG. 3 is an enlarged view illustrating a main portion of a region inward in a vehicle width direction of the tread surface illustrated in FIG. 2.

FIG. 3 is an enlarged view illustrating a main portion of the region inward in the vehicle width direction of the tread surface illustrated in FIG. 2. The same drawing especially illustrates the enlarged inner shoulder land portion 31 and inner second land portion 32.

As illustrated in FIG. 3, the inner shoulder land portion 31 includes a single circumferential narrow groove 311, a plurality of inner shoulder lug grooves 312, a plurality of inner shoulder sipes 313, and a narrow rib 314 defined by the circumferential narrow groove 311 and the shoulder main groove 21.

The circumferential narrow groove 311 is a narrow groove extending in the tire circumferential direction and extending continuously around the entire circumference of the tire. The circumferential narrow groove 311 allows improving drainage properties of the shoulder land portion 31 while ensuring rigidity of the shoulder land portion 31. In the configuration of FIG. 3, the circumferential narrow groove 311 has a straight shape, but the configuration is not limited thereto, and the circumferential narrow groove 311 may have a zigzag shape (not illustrated). Additionally, a groove width Ws1 (dimension symbol is omitted in the drawings) of the circumferential narrow groove 311 and a groove width Wm1 (dimension symbol is omitted in the drawings) of the inner side shoulder main groove 21 have the relationship $0.10 \leq Ws1/Wm1 \leq 0.40$. Additionally, the groove width Ws1 and a groove depth Hs 1 (dimension symbol is omitted in the drawings) of the circumferential narrow groove 311 are in the range of from 0.8 mm $\leq Ws1 \leq 3.0$ mm and 2.0 mm $\leq Hs1 \leq 4.5$ mm.

Additionally, a distance D1 from the tire ground contact edge T to the groove center line of the circumferential narrow groove 311 in the tire lateral direction and a ground contact width W1 of the inner shoulder land portion 31 preferably have the relationship $0.55 \leq D1/W1 \leq 0.85$, and more preferably have the relationship $0.65 \leq D1/W1 \leq 0.75$. Accordingly, the position of the circumferential narrow groove 311 is made appropriate to improve the wet performance of the tire, and the rigidity of a small land portion defined by the circumferential narrow groove 311 is ensured to ensure the dry performance of the tire.

The ground contact width of the land portion is measured as the maximum linear distance in the tire axial direction of a contact surface between a flat plate and the land portion when the tire is mounted on a specified rim, inflated to the specified internal pressure, placed perpendicular to the flat plate in a static state, and loaded with a load corresponding to the specified load.

The inner shoulder lug groove 312 extends from the tire ground contact edge T in the tire lateral direction, intersects with the circumferential narrow groove 311, and terminates in a ground contact surface of the inner shoulder land portion 31 without connecting to the inner side shoulder main groove 21. Additionally, the plurality of inner shoulder lug grooves 312 are arranged at a predetermined pitch in the tire circumferential direction. In the configuration of FIG. 3, the inner shoulder lug grooves 312 have an arc shape gently curved in the tire circumferential direction, but no such limitation is intended. The inner shoulder lug grooves 312 may have a straight shape or a bent shape (not illustrated). Additionally, a groove width of the inner shoulder lug groove 312 is in the range of from 1.5 mm or more to 4.5 mm or less, and its groove depth is in the range of from 55% or more to 80% or less of the groove depth of the inner side shoulder main groove 21. The maximum inclination angle of the inner shoulder lug groove 311 with respect to the tire circumferential direction is in the range of from 75 degrees or more to 105 degrees or less. This reduces the pattern noise of the tire.

The groove width and the groove depth of the shoulder lug groove are measured as the maximum groove width and the maximum groove depth in the ground contact surface.

The maximum inclination angle of the lug grooves is measured as the maximum value of an angle formed by a tangent line at any point on the groove center line of the lug groove and the tire circumferential direction.

The inner shoulder sipe 313 extends from the inner side shoulder main groove 21 in the tire lateral direction, intersects with the circumferential narrow groove 311, and terminates in the ground contact surface of the inner shoulder land portion 31 without intersecting with the tire ground contact edge T. Also, a single inner shoulder sipe 313 is disposed between the adjacent inner shoulder lug grooves 312, 312. Thus, the inner shoulder lug grooves 312 and the inner shoulder sipes 313 are disposed in alternation in the tire circumferential direction. Accordingly, compared to a configuration in which only the lug grooves or only the sipes are disposed in the tire circumferential direction, the wet performance and the dry performance of the tire are balanced, and the pattern noise of the tire is reduced.

Additionally, in the configuration of FIG. 3, the inner shoulder sipe 313 has a linear shape or a gentle arc shape, and extends inclined to be parallel to the inner shoulder lug groove 312. Also, a distance D2 between intersection points of the inner shoulder lug groove 312 and the inner shoulder sipe 313 with the circumferential narrow groove 311 in the tire circumferential direction is in the range of from 35% or more to 65% or less to a pitch length P1 of the inner shoulder lug groove 312. Additionally, a sipe width of the inner shoulder sipe 313 is in the range of from 0.6 mm or more to 1.8 mm or less, and its sipe depth is in the range of from 3.0 mm or more to 7.0 mm or less. Thus, the inner shoulder sipe 313 properly closes when the tire comes into contact with the ground.

The sipe width is measured as the maximum distance of the opening width of the sipe at the road contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state. Additionally, in a configuration in which a sipe includes a ridged/grooved portion on the groove bottom, the sipe depth is measured excluding this portion.

The narrow rib 314 is defined by the circumferential narrow groove 311 and the shoulder main groove 21 and extends in the tire circumferential direction. Additionally, the narrow rib 314 is divided in the tire circumferential direction by the plurality of inner shoulder sipes 313, and thus a plurality of rectangular road contact surfaces (reference sign is omitted in the drawings) are formed. One rectangular road contact surface includes a terminating end portion of one inner shoulder lug groove 312. On the other hand, the rectangular road contact surface is not divided by other sipes or lug grooves and continues in the tire circumferential direction. Additionally, a rib width Wr (see FIG. 4 described later) of the narrow rib 314 is in the range of 5.0 mm or more. The upper limit of the rib width Wr is not particularly limited, but is subject to restrictions by the distance D1 of the circumferential narrow groove 311 described above.

Figure 4:
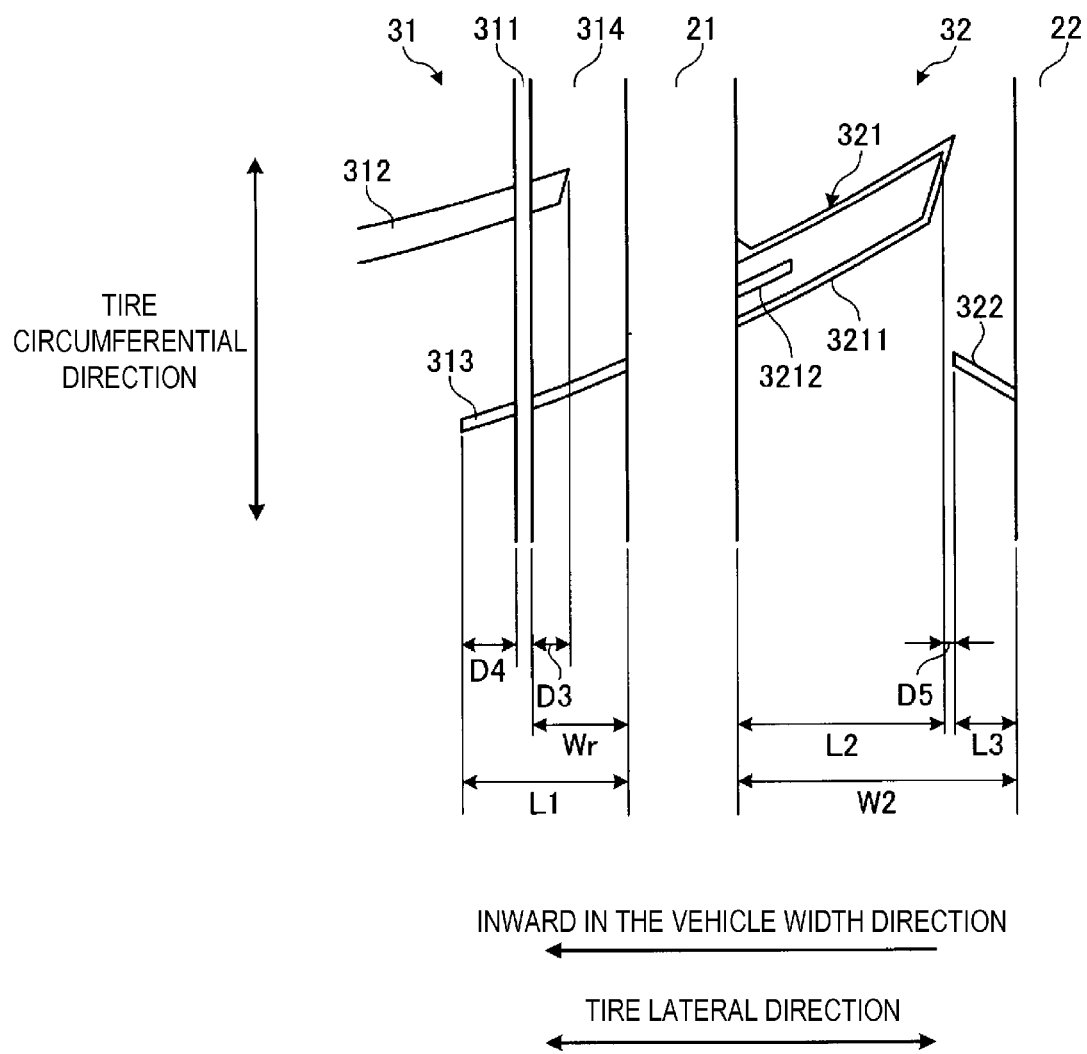
FIG. 4 is an enlarged view illustrating main portions of an inner shoulder land portion and an inner second land portion illustrated in FIG. 3.

FIG. 4 is an enlarged view illustrating main portions of the inner shoulder land portion and the inner second land portion illustrated in FIG. 3.

In FIG. 4, as described above, the inner shoulder lug groove 312 extends in the tire lateral direction, intersects with the circumferential narrow groove 311, and terminates in the ground contact surface of the shoulder land portion 31, namely, the inside of the narrow rib 314, without connecting to the inner side shoulder main groove 21. At this time, a distance D3 from the circumferential narrow groove 311 to the terminating end portion of the inner shoulder lug groove 312 in the tire lateral direction and the rib width Wr of the narrow rib 314 defined by the circumferential narrow groove 311 and the inner side shoulder main groove 21 preferably have the relationship $0.20 \leq D3/Wr \leq 0.60$, and more preferably have the relationship $0.30 \leq D3/Wr \leq 0.40$. The lower limit ensures an effect of improving the drainage properties by the inner shoulder lug grooves 312 and improves the wet performance of the tire. The upper limit ensures the rigidity of the narrow rib 314 and ensures the dry performance of the tire.

Additionally, an extension length L1 in the tire lateral direction of the inner shoulder sipe 313 and a ground contact width W1 (see FIG. 3) of the inner shoulder land portion 31 preferably have the relationship $0.35 \leq L1/W1 \leq 0.60$, and more preferably have the relationship $0.40 \leq L1/W1 \leq 0.55$. The lower limit ensures a water removal action by the inner shoulder sipe 313 and improves the wet performance of the tire. The upper limit ensures the rigidity of the shoulder land portion 31 and ensures the dry performance of the tire.

Also, as described above, the inner shoulder sipe 313 extends in the tire lateral direction, intersects with the circumferential narrow groove 311, and terminates in the ground contact surface of the inner shoulder land portion 31 without intersecting with the tire ground contact edge T. At this time, a distance D4 from the circumferential narrow groove 311 to the terminating end portion of the inner shoulder sipe 313 in the tire lateral direction and the distance D3 from the circumferential narrow groove 311 to the terminating end portion of the inner shoulder lug groove 312 in the tire lateral direction preferably have the relationship $1.00 \leq D4/D3 \leq 2.00$, and more preferably have the relationship $1.10 \leq D4/D3 \leq 1.50$. Thus, the wet performance of the tire and pattern noise performance are balanced at high levels.

Inner Second Land Portion

As illustrated in FIG. 3, the inner second land portion 32 includes a plurality of inner second lug grooves 321 and a plurality of auxiliary sipes 322.

The inner second lug groove 321 extends from the inner side shoulder main groove 21 in the tire lateral direction and terminates in the inner second land portion 32 without connecting to the inner side center main groove 22. Additionally, the plurality of inner second lug grooves 321 are arranged in the tire circumferential direction at the same pitch length P1 as that of the inner shoulder lug grooves 312. In the configuration of FIG. 3, the inner second lug groove 321 has an arc shape that is gently curved in the tire circumferential direction, but no such limitation is intended. The inner second lug groove 321 may have a straight shape or a bent shape (not illustrated). The groove width of the inner second lug groove 321 is in the range of from 1.5 mm or more to 4.5 mm or less, and its groove depth is in the range of 55% or more to 80% or less of the groove depth of the inner side shoulder main groove 21. The maximum inclination angle of the inner second lug groove 321 with respect to the tire circumferential direction is in the range of from 45 degrees or more to 80 degrees or less. The lower limit of the maximum inclination angle suppresses occurrence of chipping wear, and the upper limit ensures a wet turning performance of the tire.

The inner second lug groove 321 and the inner shoulder sipe 313 of the inner shoulder land portion 31 are inclined in mutually same direction with respect to the tire circumferential direction. Thus, drainage properties in the region inward in the vehicle width direction are improved. Especially, in the configuration of FIG. 3, the inner second lug groove 321 extends along an extension line of the inner shoulder sipe 313. Specifically, when the extension line of the groove center line of the inner shoulder sipe 313, that is, the straight-line-shaped or arc-shaped extension line as the groove center line, is drawn on the tread contact surface, the groove center line of the inner second lug groove 321 extends along this extension line. Additionally, it can be said that, when a distance between the extension line of the groove center line of the inner shoulder sipe 313 and the groove center line of the inner second lug groove 321 is 5.0 mm or less, the inner second lug groove 321 extends along the extension line of the inner shoulder sipe 313.

Note that sipes may be formed in place of the inner second lug grooves 321 as in a modified example described later.

The auxiliary sipe 322 extends from the inner side center main groove 22 in the tire lateral direction and terminates in the ground contact surface of the inner second land portion 32. Also, a single auxiliary sipe 322 is disposed between the adjacent inner second lug grooves 321, 321. The inner second lug grooves 321 and the auxiliary sipes 322 are disposed in alternation in the tire circumferential direction. Accordingly, compared to a configuration in which only the lug grooves or only the sipes are disposed in the tire circumferential direction, the wet performance and the dry performance of the tire are balanced, and the pattern noise of the tire is reduced. In particular, the inner second lug groove 321 is disposed on the edge portion on the tire ground contact edge T side of the inner second land portion 32, and the auxiliary sipe 322 is disposed on the edge portion on the tire equatorial plane CL side of the inner second land portion 32, thereby effectively enhancing the balance between the wet performance and the dry performance of the tire.

The auxiliary sipe 322 and the inner shoulder sipe 313 of the inner shoulder land portion 31 are inclined in mutually opposite directions with respect to the tire circumferential direction. Accordingly, compared to a configuration in which both are inclined in the same direction, an edge effect to both directions in the tire circumferential direction is ensured, the wet performance of the tire is improved, and the pattern noise of the tire is reduced. Additionally, a sipe width of the auxiliary sipe 322 is in the range of from 0.6 mm or more to 1.8 mm or less, and its sipe depth is in the range of from 3.0 mm or more to 7.0 mm or less. Thus, the auxiliary sipe 322 appropriately closes when the tire comes into contact with the ground.

In FIG. 4, an extension length L2 of the inner second lug groove 321 in the tire lateral direction and a ground contact width W2 of the inner second land portion 32 preferably have the relationship $0.50 \leq L2/W2 \leq 0.80$, and more preferably have the relationship $0.60 \leq L2/W2 \leq 0.70$. The lower limit ensures an effect of improving drainage properties by the inner second lug groove 321 and improves the wet performance of the tire. The upper limit ensures the rigidity of the inner second land portion 32 and ensures the dry performance of the tire.

The inner second lug groove 321 has a chamfered portion 3211 in at least one groove opening portion to the road contact surface of the inner second land portion 32. The chamfered portion 3211 extends along the edge portion of the groove opening portion of the inner second lug groove 321. Thus, a groove volume of the inner second lug groove 321 increases, and a drainage function of the inner second lug groove 321 is improved. For example, in the configuration of FIG. 4, the chamfered portion 3211 is formed around the entire periphery of the inner second lug groove 321 having a semi-closed structure, and the width of the chamfered portion 3211 is widened at the meeting portion of the inner second lug groove 321 and the inner side shoulder main groove 21.

The chamfered portion is defined as a part that connects the meeting portion between the road contact surface of the land portion and the wall surface of the groove (that is, the edge portion of the land portion) with a plane (for example, a corner chamfer) or a curved surface (for example, a rounded chamfer).

In the configuration of FIG. 4, the inner second lug groove 321 includes a groove bottom sipe 3212. The groove bottom sipe 3212 is shorter than the inner second lug groove 321, extends to the groove bottom of the inner second lug groove 321, and opens to the inner side shoulder main groove 21.

Additionally, an extension length L3 of the auxiliary sipe 322 in the tire lateral direction and the ground contact width W2 of the inner second land portion 32 preferably have the relationship $0.15 \leq L3/W2 \leq 0.30$, and more preferably have the relationship $0.20 \leq L3/W2 \leq 0.25$. The lower limit ensures the water removal action and a suppression action of uneven wear by the auxiliary sipe 322 and improves the wet performance and the uneven wear resistance performance of the tire. The upper limit ensures the rigidity of the inner second land portion 32 and ensures the dry performance of the tire.

In particular, in the configuration of FIG. 4, the inner second lug groove 321 and the auxiliary sipe 322 are disposed without an overlap in the tire lateral direction. A distance D5 between the inner second lug groove 321 and the auxiliary sipe 322 in the tire lateral direction is preferably in the range $0 \text{ mm} \leq D5$, and more preferably in the range $2.0 \text{ mm} \leq D5$. Accordingly, this configuration ensures the rigidity of the inner second land portion 32 and ensures the dry performance of the tire compared to a configuration in which both overlap. The upper limit of the distance D5 is not particularly limited, but is subject to restrictions in relation to the extension lengths L2, L3 of the inner second lug groove 321 and the auxiliary sipe 322.

Center Land Portion

Figure 5:
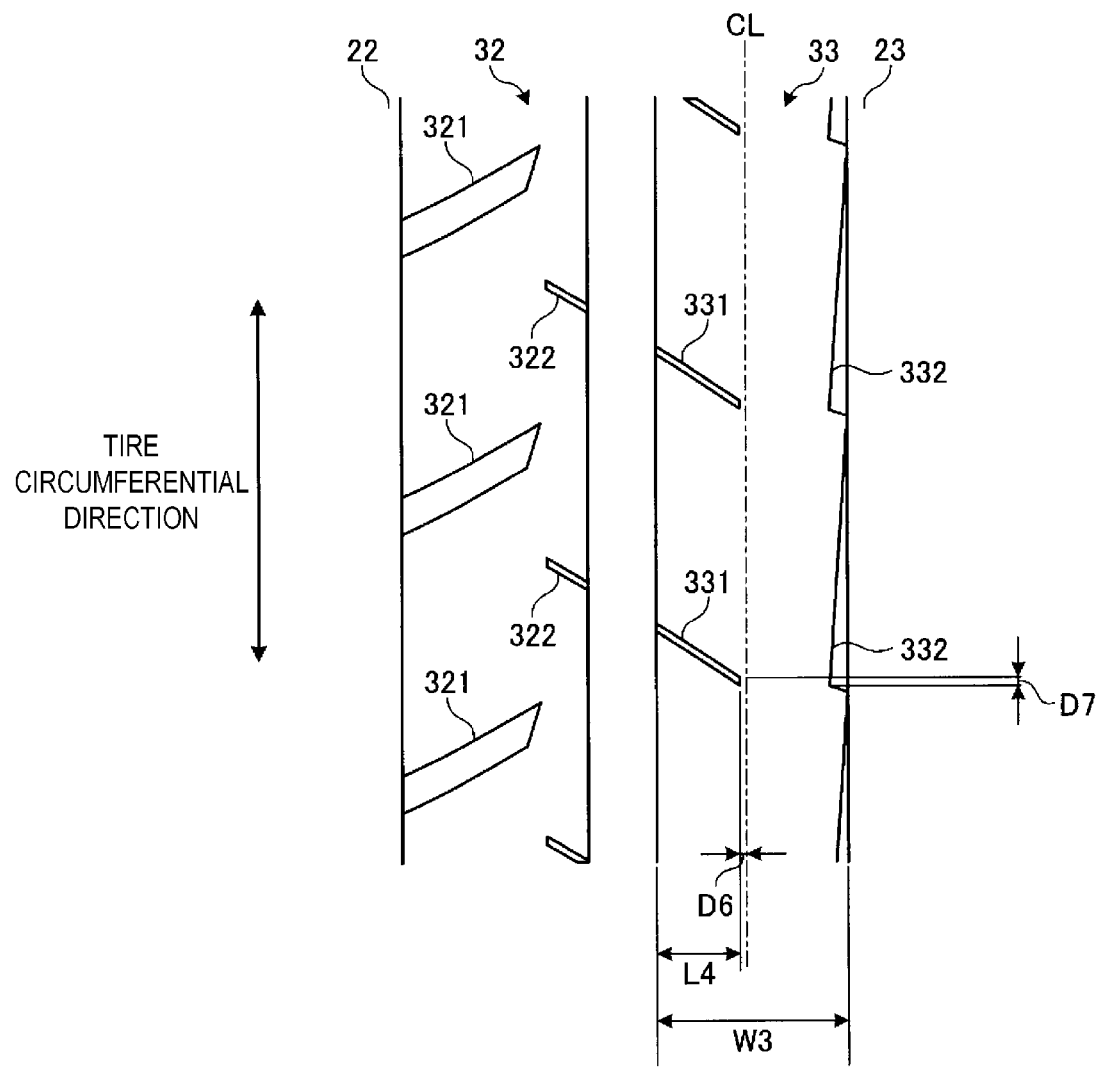
FIG. 5 is an enlarged view illustrating a main portion of a region inward in a vehicle width direction of a tread surface illustrated in FIG. 2.

FIG. 5 is an enlarged view illustrating a main portion of the region inward in the vehicle width direction of the tread surface illustrated in FIG. 2. The same drawing especially illustrates the enlarged inner second land portion 32 and center land portion 33.

As illustrated in FIG. 5, the center land portion 33 includes a plurality of center sipes 331 and a plurality of chamfered portions 332.

The center sipe 331 extends from the inner side center main groove 22 toward the tire equatorial plane and terminates in the ground contact surface of the center land portion 33. Additionally, the plurality of center sipes 331 are arranged at a predetermined interval in the tire circumferential direction. Additionally, a sipe width of the center sipe 331 is in the range of from 0.6 mm or more to 1.8 mm or less, and its sipe depth is in the range of from 3.0 mm or more to 7.0 mm or less. Accordingly, the center sipe 331 properly closes when the tire comes into contact with the ground. In such a configuration, compared to a configuration in which a plurality of lug grooves are arranged in the center land portion (not illustrated), the pattern noise of the tire is reduced, tread rigidity is increased, and the dry performance of the tire is improved. Also, the maximum inclination angle of the center sipe 331 with respect to the tire circumferential direction is in the range of from 45 degrees or more to 80 degrees or less. The lower limit of the maximum inclination angle suppresses the occurrence of chipping wear, and the upper limit ensures the wet turning performance of the tire.

Additionally, the center sipe 331 and the inner second lug groove 321 of the inner second land portion 32 are inclined in mutually opposite directions with respect to the tire circumferential direction. Accordingly, compared to a configuration in which both are inclined in the same direction, an edge effect to both directions in the tire circumferential direction is ensured, the wet performance of the tire is improved, and the pattern noise of the tire is reduced.

Additionally, the center sipe 331 and the auxiliary sipe 322 of the inner second land portion 32 are mutually inclined in the same direction with respect to the tire circumferential direction. Thus, drainage properties in the region inward in the vehicle width direction are improved. In particular, in the configuration of FIG. 5, the center sipe 331 extends along an extension line of the auxiliary sipe 322. Specifically, when the extension line of the auxiliary sipe 322, that is, the straight-line-shaped or arc-shaped extension line, is drawn on the tread contact surface, the center sipe 331 extends along this extension line. Additionally, it can be said that, when a distance between the extension line of the auxiliary sipe 322 and the center sipe 331 is 5.0 mm or less, the center sipe 331 extends along the extension line of the auxiliary sipe 322.

Additionally, an extension length L4 of the center sipe 331 in the tire lateral direction and a ground contact width W3 of the center land portion 33 preferably have the relationship $0.30 \leq L4/W3 \leq 0.60$, and more preferably have the relationship $0.40 \leq L4/W3 \leq 0.50$. The lower limit ensures the water removal action of the center sipe 331 and improves the wet performance of the tire. The upper limit ensures the rigidity of the center land portion 33 and ensures the dry performance of the tire.

In the configuration of FIG. 5, the center sipe 331 terminates in the region inward in the vehicle width direction without intersecting with the tire equatorial plane CL. A distance D6 between a terminating end portion of the center sipe 331 and the tire equatorial plane CL is preferably in the range of 1.0 mm or more. Thus, the wet performance of the tire and pattern noise performance are balanced at high levels. The upper limit of the distance D6 is not particularly limited, but is subject to restrictions in relation to the extension length L4 of the center sipe 331.

The chamfered portions 332 are formed on the edge portion of the center land portion 33 outward in the vehicle width direction (see FIG. 2). In the configuration of FIG. 5, the chamfered portion 332 has a corner chamfer in a three-sided pyramid, and the chamfered portions 332 have an L shape formed by connecting long portions and short portions on a road contact surface of the center land portion 33. Additionally, the plurality of chamfered portions 332 are arranged in the tire circumferential direction at the same pitch length P1 (see FIG. 3) as that of the inner shoulder lug grooves 312 and are formed continuously in the tire circumferential direction. Thus, the edge portion of the center land portion 33 has a zigzag shape formed by connecting the long portions and the short portions in alternation. The effect of the edge portion with the zigzag shape improves the wet performance of the tire. In addition, a ratio between a circumferential length of the short portion and a circumferential length of the long portion of the chamfered portion 332 (dimension symbol is omitted in drawing) is preferably in the range of from 0.03 or more to 0.10 or less, and more preferably in the range of from 0.04 or more to 0.06 or less.

Additionally, the zigzag-shaped bent portions of the chamfered portions 332 and the terminating end portions of the center sipes 331 are at the same position in the tire circumferential direction. Specifically, it can be said that, when a distance D7 between the bent portion of the chamfered portion 332 and the terminating end portion of the center sipe 331 in the tire circumferential direction is 5.0 mm or less, both are at the same position in the tire circumferential direction. This brings an effect that the uneven wear resistance of the tire is improved.

Outer Second Land Portion and Outer Shoulder Land Portion

Figure 6:
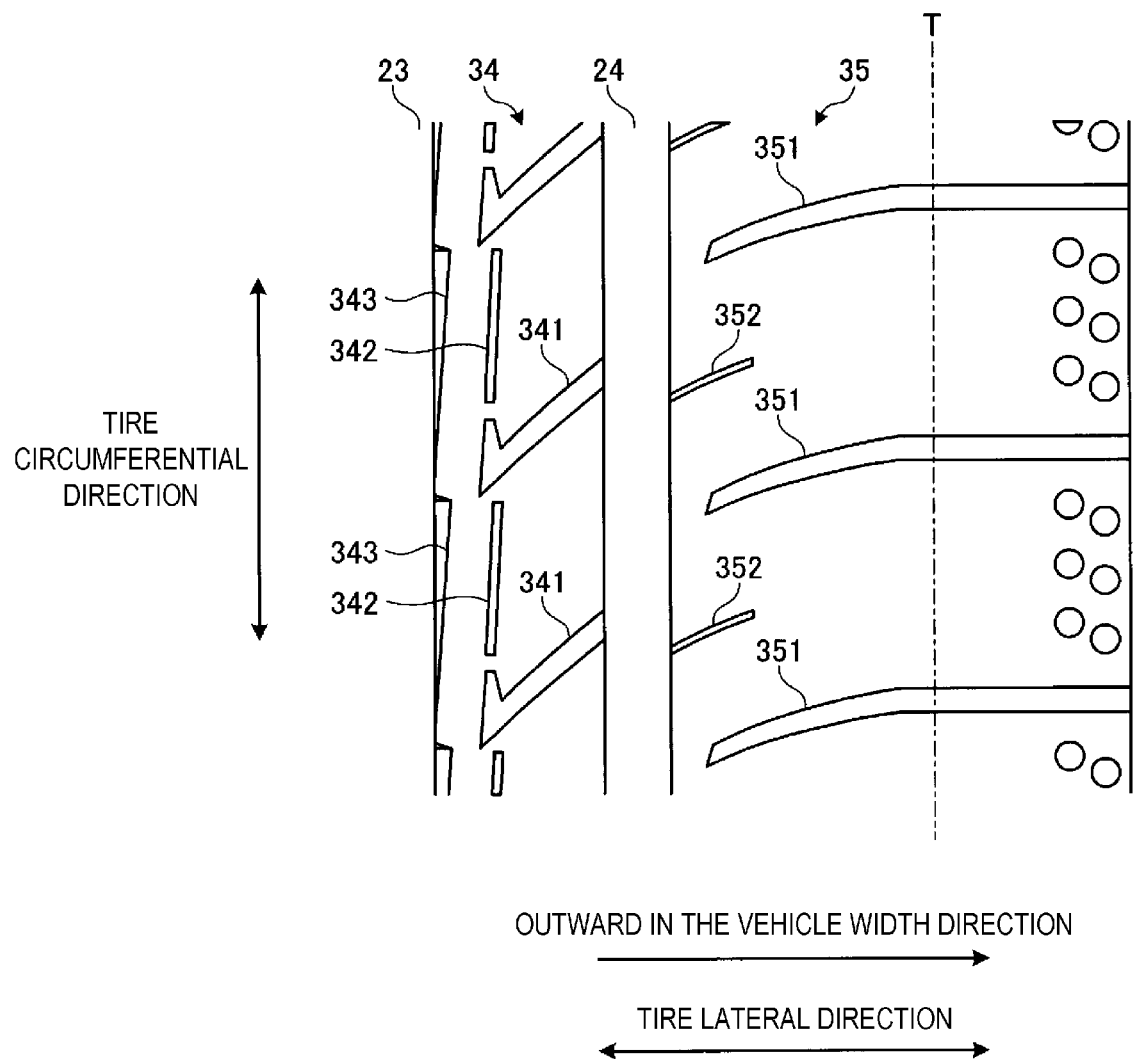
FIG. 6 is an enlarged view illustrating a main portion of a region outward in the vehicle width direction of the tread surface illustrated in FIG. 2.

FIG. 6 is an enlarged view illustrating a main portion of the region outward in the vehicle width direction of the tread surface illustrated in FIG. 2. The same drawing especially illustrates enlarged outer second land portion 34 and outer shoulder land portion 35.

As illustrated in FIG. 6, the outer second land portion 34 includes a plurality of bent lug grooves 341, a plurality of circumferential narrow grooves 342, and a plurality of chamfered portions 343.

The bent lug groove 341 extends from the outer shoulder main groove 24 in the tire lateral direction, bends in a hook shape in the tire circumferential direction, and terminates in a ground contact surface of the outer second land portion 34. Additionally, the bent lug groove 341 has an extending portion in the tire lateral direction having a long structure and an extending portion in the tire circumferential direction having a short structure. Additionally, the plurality of bent lug grooves 341 are arranged in the tire circumferential direction at the same pitch length P1 (see FIG. 3) as that of the inner shoulder lug grooves 312. An extension length (dimension symbol is omitted in drawings) of the bent lug groove 341 in the tire lateral direction is in the range of from 65% or more to 85% or less to a ground contact width (dimension symbol is omitted in drawings) of the outer second land portion 34. Accordingly, the dry performance and the wet performance of the tire are improved in good balance. As illustrated in FIG. 2, the body portion of the bent lug groove 341 and the inner second lug groove 321 of the inner second land portion 32 are inclined in the same direction with respect to the tire circumferential direction. This provides the wet performance of the tire regardless of a tire rotation direction.

The circumferential narrow groove 342 is disposed between the adjacent bent lug grooves 341, 341 and extends in the tire circumferential direction. Also, a single circumferential narrow groove 342 is disposed between the adjacent bent lug grooves 341, 341 and is disposed to be separated from the respective adjacent bent lug grooves 341, 341. Additionally, the circumferential narrow groove 342 extends in the tire circumferential direction from a terminating end portion of the bent lug groove 341 along an extension line of the short portion of the bent lug groove 341. Additionally, the circumferential narrow groove 342 has a linear shape and extends parallel to the long portion of the chamfered portion 343 described later while being inclined with respect to the tire circumferential direction. Accordingly, an arrangement relationship between the circumferential narrow grooves 342 and the bent lug grooves 341 is made appropriate, and the rigidity of the outer second land portions 34 is made uniform.

The chamfered portion 343 is formed on the edge portion on the tire equatorial plane CL side (see FIG. 2) of the outer second land portion 34. In the configuration of FIG. 6, the chamfered portion 343 has a corner chamfer in a three-sided pyramid, and the chamfered portions 332 have an L shape formed by connecting long portions and short portions on a road contact surface of the outer second land portion 34. Additionally, the chamfered portion 343 has the same circumferential length and chamfered width as those of the chamfered portion 332 of the center land portion 33, and is disposed to be point symmetric with respect to the chamfered portion 332 of the center land portion 33. Additionally, the plurality of chamfered portions 343 are arranged continuously in the tire circumferential direction at the same pitch as that of the chamfered portions 332 of the center land portion 33. Thus, an edge portion of the outer second land portion 34 has a zigzag shape formed by connecting the long portions and the short portions in alternation, and the outer side center main groove 23 has a zigzag-shaped groove opening portion extending in the tire circumferential direction. Thus, the wet performance of the tire is enhanced.

As illustrated in FIG. 6, the outer shoulder land portion 35 includes outer shoulder lug grooves 351 and outer shoulder sipes 352.

The outer shoulder lug groove 351 extends from the tire ground contact edge T in the tire lateral direction and terminates in a ground contact surface of the outer shoulder land portion 35 without connecting to the outer shoulder main groove 24. Additionally, the plurality of outer shoulder lug grooves 351 are arranged in the tire circumferential direction at the same pitch length P1 (see FIG. 3) as that of the inner shoulder lug grooves 312 of the inner shoulder land portion 31. As illustrated in FIG. 2, the outer shoulder lug groove 351 and the inner shoulder lug groove 311 of the inner shoulder land portion 31 are inclined in the same direction with respect to the tire circumferential direction. This provides the wet performance of the tire regardless of the tire rotation direction.

The outer shoulder sipe 352 extends from the outer shoulder main groove 24 in the tire lateral direction and terminates in the ground contact surface of the outer shoulder lug groove 351 without intersecting with the tire ground contact edge T. The outer shoulder sipe 352 has a linear shape or a gentle arc shape and extends inclined to be parallel with the outer shoulder lug groove 351. Also, a single outer shoulder sipe 352 is disposed between the adjacent outer shoulder lug grooves 351, 351. Thus, the outer shoulder lug grooves 351 and the outer shoulder sipes 352 are disposed in alternation in the tire circumferential direction. Accordingly, compared to a configuration in which only the lug grooves or only the sipes are disposed in the tire circumferential direction, the wet performance and the dry performance of the tire are balanced, and the pattern noise of the tire is reduced.

As illustrated in FIG. 6, the outer shoulder sipe 352 is disposed offset with respect to the extension line (not illustrated) of the bent lug groove 341 of the outer second land portion 34 in the tire circumferential direction. Additionally, the opening positions of the outer shoulder sipe 352 and the bent lug groove 341 to the outer shoulder main groove 24 are disposed offset in the tire circumferential direction. This reduces the pattern noise of the tire.

Additionally, in the configuration of FIG. 6, the outer shoulder land portion 35 is a rib continuous in the tire circumferential direction and is not divided in the tire circumferential direction or the tire lateral direction by grooves or sipes. The outer shoulder land portion 35 does not include lug grooves opening to the edge portion on the outer shoulder main groove 24 side. Thus, the rigidity of the outer shoulder land portion 35 is enhanced.

MODIFIED EXAMPLES

Figure 7:
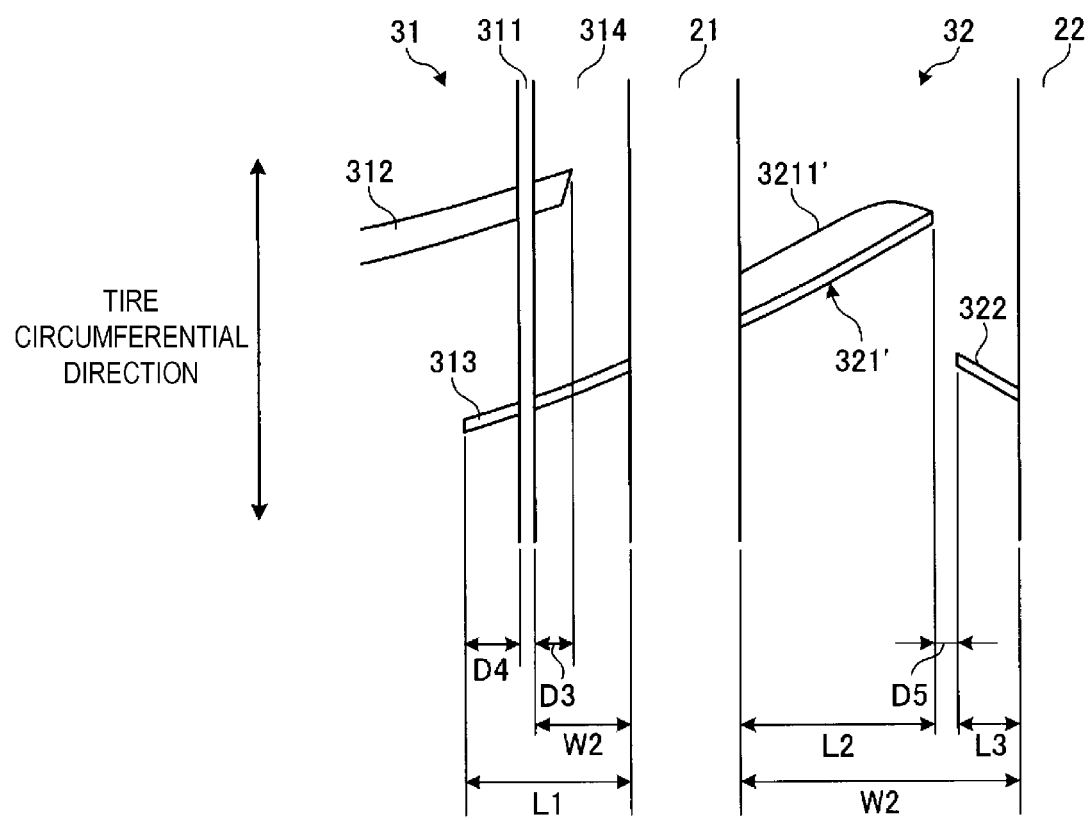
FIG. 7 is an explanatory diagram illustrating a modified example of the inner second land portion illustrated in FIG. 4.
Figure 8:
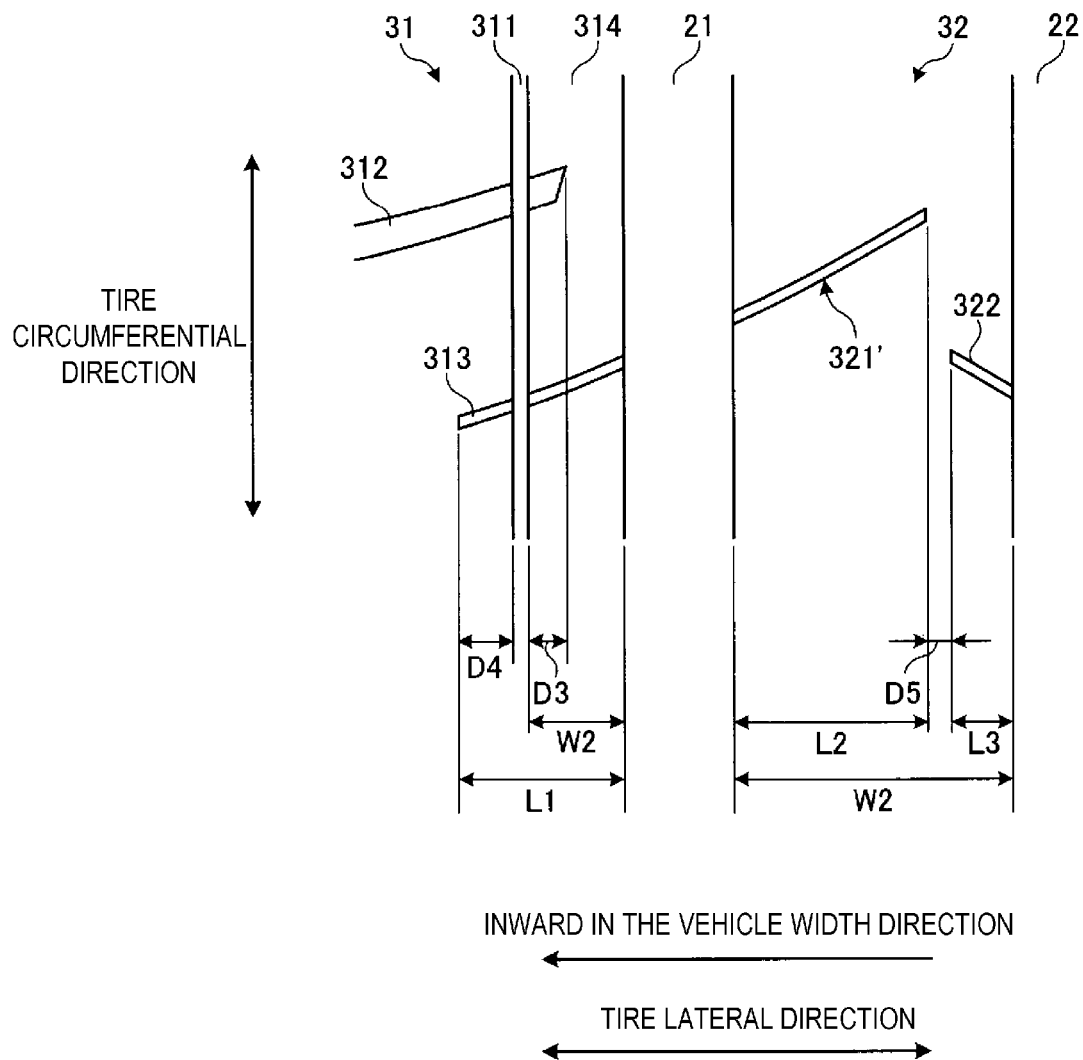
FIG. 8 is an explanatory diagram illustrating a modified example of the inner second land portion illustrated in FIG. 4.

FIG. 7 and FIG. 8 are explanatory diagrams illustrating the modified example of the inner second land portion illustrated in FIG. 4. In the drawing, constituents described in FIG. 4 have the same reference signs, and their explanations are omitted.

In the configuration of FIG. 4, the inner shoulder sipe 313 and the inner second lug groove 321 are each open to the inner side shoulder main groove 21 and are disposed so as to be opposed to one another with the inner side shoulder main groove 21 interposed therebetween. The inner shoulder sipe 313 is located outward in the tire lateral direction with respect to the inner second lug groove 321. Such a configuration is preferred compared to a configuration in which both are lug grooves in that the rigidity of the inner shoulder land portion 31 on the tire ground contact edge T side (see FIG. 2) is increased, and the dry performance of the tire is improved. Additionally, compared to a configuration in which both are sipes, the inner second land portion 32 on the tire equatorial plane CL side (see FIG. 2) includes the inner second lug grooves 321 opening to outward in the tire lateral direction, and this is preferred in that the wet performance of the tire is properly ensured.

In contrast, in the configuration of FIG. 7 and FIG. 8, instead of the inner second lug groove 321 in FIG. 4, an inner second sipe 321' is disposed. Additionally, a sipe width of the inner second sipe 321' is in the range of from 0.6 mm or more to 1.8 mm or less, and its sipe depth is in the range of from 3.0 mm or more to 7.0 mm or less. Accordingly, the inner second sipe 321' properly closes when the tire comes into contact with the ground. In such a configuration, the rigidity of the left and right land portions 31, 32 of the inner side shoulder main groove 21 is increased compared to the configuration of FIG. 4 described above, and thus the dry performance of the tire is further improved and the pattern noise of the tire is reduced, which are preferred.

As illustrated in FIG. 7, the inner second sipe 321' preferably has a chamfered portion 3211' in at least one (one side in FIG. 7) opening portion to the road contact surface.

Accordingly, a groove volume of the inner second sipe 321' increases, and the drainage properties of the inner second land portion 32 are improved.

Effects

As described above, the pneumatic tire 10 includes the mounting direction indicator (not illustrated), the inner side shoulder main groove 21 and the inner side center main groove 22, and the inner shoulder land portion 31, the inner second land portion 32, and the center land portion 33. The mounting direction indicator indicates the mounting direction of the tire to a vehicle. The inner side shoulder main groove 21 and the inner side center main groove 22 are formed in the region inward in the vehicle width direction demarcated by the tire equatorial plane CL and extend in the tire circumferential direction. The inner shoulder land portion 31, the inner second land portion 32, and the center land portion 33 are formed by being defined by the inner side shoulder main groove 21 and the inner side center main groove 22 (see FIG. 2). Additionally, the inner shoulder land portion 31 includes the circumferential narrow groove 311, the inner shoulder lug groove 312, and the inner shoulder sipe 313. The circumferential narrow groove 311 extends in the tire circumferential direction. The inner shoulder lug groove 312 extends from the tire ground contact edge T in the tire lateral direction, intersects with the circumferential narrow groove 311, and terminates in the inner shoulder land portion 31. The inner shoulder sipe 313 extends from the inner side shoulder main groove 21 in the tire lateral direction, intersects with the circumferential narrow groove 311, and terminates in the inner shoulder land portion 31 (see FIG. 3).

In such a configuration, (1) the inner shoulder lug groove 312 and the inner shoulder sipe 313 intersect with the circumferential narrow groove 311, and thus the drainage properties of the shoulder land portion 31 are improved and the wet performance of the tire is improved. Additionally, (2) because the components intersecting with the circumferential narrow groove 311 are constituted by the combination of the lug groove 312 and the sipe 313, the rigidity of the inner shoulder land portion 31 is increased and the dry performance of the tire is improved compared to a configuration in which the same number of lug grooves are disposed intersecting with the circumferential narrow groove 311. These have an advantage that the wet performance and the dry performance of the tire can be provided in a compatible manner.

Additionally, in the pneumatic tire 10, the inner shoulder lug grooves 312 and the inner shoulder sipes 313 are disposed in alternation in the tire circumferential direction (see FIG. 3). This has the advantage that, compared to a configuration in which only the lug grooves or only the sipes are disposed in the tire circumferential direction at a predetermined interval, the wet performance and the dry performance of the tire are balanced, and the pattern noise of the tire is reduced.

Additionally, in the pneumatic tire 10, the extension length L1 in the tire lateral direction of the inner shoulder sipe 313 and the ground contact width W1 of the inner shoulder land portion 31 have the relationship $0.35 \leq L1/W1 \leq 0.60$ (see FIG. 3). This has the advantage that the extension length L1 of the inner shoulder sipe 313 is made appropriate. That is, the lower limit ensures the water removal action by the inner shoulder sipe 313 and improves the wet performance of the tire. Accordingly, the upper limit ensures the rigidity of the shoulder land portion 31 and ensures the dry performance of the tire.

Additionally, in the pneumatic tire 10, the distance D4 from the circumferential narrow groove 311 to the terminating end portion of the inner shoulder sipe 313 in the tire lateral direction and the distance D3 from the circumferential narrow groove 311 to the terminating end portion of the inner shoulder lug groove 312 in the tire lateral direction have the relationship $1.00 \leq D4/D3 \leq 2.00$ (see FIG. 4). This has an advantage that the wet performance and the pattern noise performance of the tire are balanced at high levels.

Additionally, in the pneumatic tire 10, the inner second land portion 32 includes the inner second lug groove 321 or the sipe (inner second sipe 321', see FIG. 7 and FIG. 8). The inner second lug groove 321 or the sipe extends from the inner side shoulder main groove 21 in the tire lateral direction and terminates in the inner second land portion 32 (see FIG. 4). The inner second lug groove 321 or the sipe 321' and the inner shoulder sipe 313 are inclined in mutually the same direction with respect to the tire circumferential direction. This has the advantage that the drainage properties in the region inward in the vehicle width direction are improved and the wet performance of the tire is improved.

Additionally, in the pneumatic tire 10, the inner second lug groove 321 or the sipe 321' extends along the extension line of the inner shoulder sipe (see FIG. 4 and FIG. 7). This has the advantage that the drainage properties in the region inward in the vehicle width direction are improved and the wet performance of the tire is improved.

Additionally, in the pneumatic tire 10, the inner second lug groove 321 or the sipe 321' includes the chamfered portion 3211, 3211' in at least one opening portion to the road contact surface of the inner second land portion 32 (see FIG. 4 and FIG. 7). Thus, there is an advantage that the groove volume of the inner second lug groove 321 increases, and the drainage function of the inner second lug groove 321 or the sipe 321' is improved.

Additionally, in the pneumatic tire 10, the inner second land portion 32 includes the auxiliary sipe 322. The auxiliary sipe 322 extends from the inner side center main groove 22 in the tire lateral direction and terminates in the inner second land portion 32 (see FIG. 4). Compared to a configuration in which a land portion includes a lug groove in each of right and left edge portions (not illustrated), such a configuration increases the rigidity of the inner second land portion 32 and therefore has the advantage that the dry performance of the tire is improved and has the advantage that the pattern noise of the tire is reduced.

Additionally, in the pneumatic tire 10, the auxiliary sipe 322 and the inner shoulder sipe 313 are inclined in mutually opposite directions with respect to the tire circumferential direction (see FIG. 4). This has the advantage that an edge effect to both directions in the tire circumferential direction is ensured, the wet performance of the tire is improved, and the pattern noise of the tire is reduced compared to a configuration in which both are inclined in the same direction.

Additionally, in the pneumatic tire 10, the extension length L3 in the tire lateral direction of the auxiliary sipe 322 and the ground contact width W2 of the inner second land portion 32 have the relationship $0.15 \leq L3/W2 \leq 0.30$. This has the advantage that the extension length L3 of the auxiliary sipes 322 is made appropriate. That is, the lower limit ensures the water removal action and the suppression action of uneven wear by the auxiliary sipe 322 and improves the wet performance and the uneven wear resistance performance of the tire. The upper limit ensures the rigidity of the inner second land portion 32 and ensures the dry performance of the tire.

Additionally, in the pneumatic tire 10, the distance D5 between the inner second lug groove 321 and the auxiliary sipe 322 in the tire lateral direction is in the range 0 mm≤D5. This has the advantage that the rigidity of the inner second land portion 32 is ensured and the dry performance of the tire is ensured compared to a configuration in which both overlap.

Additionally, in the pneumatic tire 10, the center land portion 33 includes the center sipe 331. The center sipe 331 extends from the inner side center main groove 22 toward the tire equatorial plane CL and terminates in the center land portion 33 (see FIG. 5). The center sipe 331 and the inner second lug groove 321 or the sipe 321' (see FIG. 7) of the inner second land portion 32 are inclined in mutually opposite directions with respect to the tire circumferential direction. Accordingly, compared to a configuration in which both are inclined in the same direction, an edge effect to both directions in the tire circumferential direction is ensured, the wet performance of the tire is improved, and the pattern noise of the tire is reduced.

Additionally, in the pneumatic tire 10, the center sipe 331 terminates without intersecting with the tire equatorial plane CL (see FIG. 5). The distance D6 between the terminating end portion of the center sipe 331 and the tire equatorial plane CL is in the range of from 1.0 mm or more to 5.0 mm or less. This has an advantage that the wet performance and the pattern noise performance of the tire are balanced at high levels.

Additionally, the pneumatic tire 10 includes the outer center main groove 23. The outer center main groove 23 is formed in the region outward in the vehicle width direction demarcated by the tire equatorial plane CL. The outer center main groove 23 defines the center land portion 33 (see FIG. 2). Additionally, the groove opening portion of the outer side center main groove 23 has the zigzag shape at least in the edge portion on the center land portion 33 side. The zigzag shape is formed by connecting the long portions and the short portions in alternation (see FIG. 5). Additionally, the zigzag-shaped bent portions of the outer side center main groove 23 and the terminating end portions of the center sipes 331 of the center land portion 33 are at the same position in the tire circumferential direction. This has the advantage that the uneven wear resistance of the tire is increased.

Additionally, the pneumatic tire 10 includes the outer side center main groove 23 and the outer shoulder main groove 24, and the outer second land portion 34 and the outer shoulder land portion 35. The outer side center main groove 23 and the outer shoulder main groove 24 are formed in the region outward in the vehicle width direction demarcated by the tire equatorial plane CL and extend in the tire circumferential direction. The outer second land portion 34 and the outer shoulder land portion 35 are formed by being defined by the outer side center main groove 23 and the outer shoulder main groove 24 (see FIG. 2). The land portion 34 includes the bent lug groove 341. The bent lug groove 341 extends from the outer shoulder main groove 24 in the tire lateral direction, bends in the hook shape in the tire circumferential direction, and terminates in the outer second land portion 34 (see FIG. 6). Additionally, the outer shoulder land portion 35 includes the outer shoulder sipe 352. The outer shoulder sipe 352 extends from the outer shoulder main groove 24 in the tire lateral direction and terminates in the outer shoulder land portion 35. Additionally, the outer shoulder sipe 352 is disposed offset with respect to the extension line of the bent lug groove 341 in the tire circumferential direction. This has the advantage that the pattern noise of the tire is reduced.

Example

FIG. 9 is a table showing the results of performance tests of pneumatic tires according to embodiments of the technology.

The performance test evaluated for (1) dry steering stability performance, (2) wet steering stability performance, (3) uneven wear resistance performance, and (4) pattern noise performance of a plurality of types of test tires. The test tires having a tire size of 215/55R17 are mounted on rims having a rim size of 17×7J, and an internal pressure of 240 kPa and a load specified by JATMA are applied to the test tires. The test tires are mounted on all wheels of a rear-wheel drive hybrid vehicle as a test vehicle having an engine displacement of 2.5 L.

(1) In the evaluation for dry steering stability performance, the test vehicle runs on a test course of dry road surfaces including a flat circuit at from 60 km/h to 100 km/h. Then the test driver performed a sensory evaluation regarding steering while lane changing and cornering and stability while traveling forward. The evaluation is expressed as index values and evaluated with the Comparative Example being assigned as the reference (100). In this evaluation, larger values are preferable.

(2) In the evaluation for wet steering stability performance, the test vehicle runs at a speed of 40 km/h on an asphalt road on which water is sprinkled at a water depth of 1 mm. Then the test driver performed a sensory evaluation regarding steering while lane changing and cornering and stability while traveling forward. The evaluation is expressed as index values and evaluated with the Comparative Example being assigned as the reference (100). In this evaluation, larger values are preferable.

(3) In the evaluation for uneven wear resistance performance, the test vehicle runs 100000 km on a paved road. Subsequently, uneven wear occurred in the land portion is observed for evaluation. The evaluation is expressed as index values and evaluated with the Comparative Example being assigned as the reference (100). In this evaluation, larger values are preferable.

(4) In the evaluation for pattern noise performance, the test vehicle runs on a test course of dry road surfaces for sensory evaluation by a test driver. The evaluation is expressed as index values and evaluated with the Comparative Example being assigned as the reference (100). In this evaluation, a larger value means excellent quietness and therefore is preferable.

In the test tires of Example 1 to 9, the inner shoulder land portion 31 includes the circumferential narrow groove 311, the inner shoulder lug grooves 312, and the inner shoulder sipes 313 (see FIG. 2). Additionally, the tire ground contact width TW is TW=160 mm, the ground contact width W1 of the inner shoulder land portion 31, the ground contact width W2 of the inner second land portion 32, and the ground contact width W3 of the center land portion 33 are W1=29.0 mm, W2=23.0 mm, and W3=24.0 mm, respectively.

Conventional Example includes the outer side center main groove having a straight shape and the inner second land portion not including auxiliary sipes in the test tire of Example 1. Additionally, the center land portion does not include center sipes, and the inner shoulder land portion does not include a circumferential narrow groove or inner shoulder sipes.

As shown in the test results, it has been found that the test tires of Examples 1 to 9 provide the dry steering stability performance, the wet steering stability performance, the uneven wear resistance performance, and the pattern noise performance of the tire in a compatible manner.

The invention claimed is:

1. A pneumatic tire comprising:
   a mounting direction indicator that indicates a mounting direction of the tire to a vehicle;
   an inner side shoulder main groove and an inner side center main groove that are formed in a region inward in a vehicle width direction demarcated by a tire equatorial plane and extend in a tire circumferential direction;
   an inner shoulder land portion, an inner second land portion, and a center land portion formed by being defined by the inner side shoulder main groove and the inner side center main groove; and
   the inner shoulder land portion that includes a circumferential narrow groove, an inner shoulder lug groove, and an inner shoulder sipe, the circumferential narrow groove extending in the tire circumferential direction, the inner shoulder lug groove extending from a tire ground contact edge in a tire lateral direction, intersecting with the circumferential narrow groove, and terminating in the inner shoulder land portion, the inner shoulder sipe extending from the inner side shoulder main groove in the tire lateral direction, intersecting with the circumferential narrow groove, and terminating in the inner shoulder land portion; wherein
   a groove width of the inner shoulder lug groove is in a range of from 2.1 mm or more to 4.5 mm or less;
   a sipe width of the inner shoulder sipe is in a range of from 0.6 mm or more to 1.8 mm or less;
   the inner second land portion includes an inner second lug groove;
   the inner second lug groove extends from the inner side shoulder main groove in the tire lateral direction and terminates in the inner second land portion;
   a groove width of the inner second lug groove is in a range of from 2.1 mm or more to 4.5 mm or less;
   the center land portion includes a center sipe, and the center sipe extends from the inner side center main groove toward the tire equatorial plane and terminates in the center land portion, and
   the center sipe and the inner second lug groove of the inner second land portion are inclined in mutually opposite directions with respect to the tire circumferential direction.

2. The pneumatic tire according to claim 1, wherein
   the inner shoulder lug groove comprises a plurality of inner shoulder lug grooves and the inner shoulder sipe comprises a plurality of inner shoulder sipes, and
   the inner shoulder lug grooves and the inner shoulder sipes are disposed in alternation in the tire circumferential direction.

3. The pneumatic tire according to claim 1, wherein
   an extension length L1 in the tire lateral direction of the inner shoulder sipe and a ground contact width W1 of the inner shoulder land portion have a relationship $0.35 \leq L1/W1 \leq 0.60$.

4. The pneumatic tire according to claim 1, wherein
   a distance D4 from the circumferential narrow groove to a terminating end portion of the inner shoulder sipe in the tire lateral direction and a distance D3 from the circumferential narrow groove to a terminating end portion of the inner shoulder lug groove in the tire lateral direction have a relationship $1.00 \leq D4/D3 \leq 1.50$.

5. The pneumatic tire according to claim 1, wherein
   the inner second lug groove and the inner shoulder sipe are inclined in mutually a same direction with respect to the tire circumferential direction.

6. The pneumatic tire according to claim 5, wherein
   the inner second lug groove extends along an extension line of the inner shoulder sipe.

7. The pneumatic tire according to claim 5, wherein
   the inner second lug groove includes a chamfered portion in at least one opening portion to a road contact surface of the inner second land portion.

8. The pneumatic tire according to claim 5, wherein
   the inner second land portion includes an auxiliary sipe, and the auxiliary sipe extends from the inner side center main groove in the tire lateral direction and terminates in the inner second land portion.

9. The pneumatic tire according to claim 8, wherein
   the auxiliary sipe and the inner shoulder sipe are inclined in mutually opposite directions with respect to the tire circumferential direction.

10. The pneumatic tire according to claim 8, wherein
    an extension length L3 in the tire lateral direction of the auxiliary sipe and a ground contact width W2 of the inner second land portion have a relationship $0.15 \leq L3/W2 \leq 0.30$.

11. The pneumatic tire according to claim 8, wherein
    a distance D5 between the inner second lug groove and the auxiliary sipe in the tire lateral direction is in a range $0 \text{ mm} \leq D5$.

12. The pneumatic tire according to claim 1, wherein
    the center sipe terminates without intersecting with the tire equatorial plane, and
    a distance D6 between a terminating end portion of the center sipe and the tire equatorial plane is in a range of from 1.0 mm or more to 5.0 mm or less.

13. The pneumatic tire according to claim 1, comprising
    an outer side center main groove formed in a region outward in the vehicle width direction demarcated by the tire equatorial plane, the outer center main groove defining the center land portion, wherein
    a groove opening portion of the outer side center main groove has a zigzag shape at least in an edge portion on a center land portion side, and the zigzag shape is formed by connecting long portions and short portions in alternation, and
    a bent portion of the zigzag shape of the outer side center main groove and terminating end portion of the center sipe of the center land portion are at a same position in the tire circumferential direction.

14. The pneumatic tire according to claim 1, comprising
    an outer side center main groove and an outer shoulder main groove formed in a region outward in the vehicle width direction demarcated by the tire equatorial plane and extending in the tire circumferential direction, an outer second land portion and an outer shoulder land portion formed by being defined by the outer side center main groove and the outer shoulder main groove, wherein
    the outer second land portion includes a bent lug groove, and the bent lug groove extends from the outer shoulder main groove in the tire lateral direction, bends in a hook shape in the tire circumferential direction, and terminates in the outer second land portion, the outer shoulder land portion includes an outer shoulder sipe, and the outer shoulder sipe extends from the outer shoulder main groove in the tire lateral direction and terminates in the outer shoulder land portion, and the outer shoulder sipe is disposed offset with respect to an extension line of the bent lug groove in the tire circumferential direction.

* * * * *